(12) United States Patent
Youssef et al.

(10) Patent No.: US 10,899,854 B2
(45) Date of Patent: Jan. 26, 2021

(54) PROCESS FOR THE PRODUCTION OF A POLYMER USING A COMPOUND COMPRISING AT LEAST 2 UNSATURATED CARBON-CARBON BONDS

(71) Applicant: SABIC Global Technologies B.V., Bergen op Zoom (NL)

(72) Inventors: Ahmed Abouelfetouh Youssef, Mount Vernon, IN (US); Vern Lowry, Ottawa, IL (US); Dane Ferraris, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 164 days.

(21) Appl. No.: 16/330,314

(22) PCT Filed: Aug. 21, 2017

(86) PCT No.: PCT/EP2017/071029
§ 371 (c)(1),
(2) Date: Mar. 4, 2019

(87) PCT Pub. No.: WO2018/041654
PCT Pub. Date: Mar. 8, 2018

(65) Prior Publication Data
US 2019/0225717 A1    Jul. 25, 2019

(30) Foreign Application Priority Data
Sep. 5, 2016 (EP) ..................... 16187196

(51) Int. Cl.
*C08F 2/01* (2006.01)
*C08F 36/02* (2006.01)
*C08F 6/00* (2006.01)

(52) U.S. Cl.
CPC ............. *C08F 6/003* (2013.01); *C08F 2/01* (2013.01); *C08F 36/02* (2013.01)

(58) Field of Classification Search
CPC .. C08F 6/003; C08F 2/01; C08F 36/02; C08L 47/00
(Continued)

(56) References Cited

U.S. PATENT DOCUMENTS

2011/0172375 A1* 7/2011 Yeh .................... C08F 6/003
526/74

FOREIGN PATENT DOCUMENTS

| CN | 103965380 A | 8/2014 |
|---|---|---|
| CN | 105085976 A | 11/2015 |

(Continued)

OTHER PUBLICATIONS

Written Opinion of the International Search Report for International Application No. PCT/EP2017/071029; dated Nov. 3, 2017; 4 pages.
(Continued)

*Primary Examiner* — William K Cheung
(74) *Attorney, Agent, or Firm* — Cantor Colburn LLP

(57) ABSTRACT

The present invention relates to a process for the production of a polymer using a compound comprising at least 2 unsaturated carbon-carbon bonds, wherein the process comprises a polymerization section and a purification section, wherein the product from the polymerization section is subjected in the purification section to a sequence of purification steps comprising: removal of the vapor phase from the product from the polymerization section by means of flash separation to obtain a first vapor phase and a polymerization product; subjecting the first vapor phase to a compression and condensation treatment to obtain a second vapor phase and a condensed monomer phase; wherein the purification steps are conducted in this order. Such process allows for the optimal utilisation of raw materials in the polymerization process.

15 Claims, 1 Drawing Sheet

(58) Field of Classification Search
USPC .......................................................... 526/68
See application file for complete search history.

(56) References Cited

FOREIGN PATENT DOCUMENTS

| EP | 0187715 A2 | 7/1986 |
|---|---|---|
| EP | 0187715 A3 | 7/1986 |
| EP | 0887379 A1 | 12/1998 |
| EP | 2711350 A1 | 3/2014 |
| EP | 3020751 A1 | 5/2016 |
| WO | 2009082640 A1 | 7/2009 |
| WO | 2013135563 A1 | 9/2013 |

OTHER PUBLICATIONS

Chinese Office Action for the corresponding Chinese Application No. 2017800540016; dated Sep. 27, 2020; English translation 8 pages.

* cited by examiner

US 10,899,854 B2

PROCESS FOR THE PRODUCTION OF A POLYMER USING A COMPOUND COMPRISING AT LEAST 2 UNSATURATED CARBON-CARBON BONDS

CROSS REFERENCE TO RELATED APPLICATIONS

This application is a U.S. National Stage filing of International Application No. PCT/EP2017/071029, filed Aug. 21, 2017, which claims priority to European Application No. 16187196.7 filed Sep. 5, 2016, both of which are incorporated herein by reference in their entirety.

The present invention relates to a process for the production of a polymer using a compound comprising at least 2 unsaturated carbon-carbon bonds. The invention further relates to a polymer produced according to the process.

In polymerization processes, the optimal utilisation of raw materials is a very important aspect. For many reasons, including environmental considerations, but also for economic reasons, it is desirable to strive to maximize the conversion of raw materials in polymerization processes into valuable products. Furthermore, it is often desirable to strive to maximize the conversion of raw materials into a particular dedicated product, thus avoiding separation steps needed to remove by-products and obtain the desired final products from a process.

However, polymerization processes often are of such nature that a fraction of the raw materials is not converted into a desired polymeric product. This may for example be due to the nature of the chemical reactions that take place.

One such polymerization process is the production of polymers by polymerization of compounds comprising at least 2 unsaturated carbon-carbon bonds. Examples of such compounds include butadiene. In the process for production of polybutadiene by polymerization of butadiene, a polymerization process is performed in a polymerization section. The polymerization section results in a product mixture comprising a fraction of the desired product, as well as a fraction of unreacted raw material.

The product mixture that is obtained from the polymerization section may be subjected to a separation step such as a flash separation step to separate the polymeric product and a vapor phase. In a flash separation operation, a product mixture having a given pressure is introduced into a vessel having a pressure lower than the pressure of at which the product mixture is fed to the vessel. As a result of this reduced pressure, a fraction of the material in the product mixture will evaporate to form a vapor phase. A further fraction will not evaporate and will form a liquid or solid phase.

Flash separation vessels are well known in the art of production of polymeric materials. The product mixture that is obtained from the polymerization section may be introduced into the flash separation vessel via one or more inlets, for example positioned in the side wall of a flash separation vessel. The polymeric product may form a solid phase and may for example be removed from the flash vessel via a bottom outlet. The vapor phase that is obtained by the flashing operation may for example be removed from the flash vessel via a top outlet, forming a first vapor phase.

The flashing operation may for example be performed at a pressure drop of ≤300 kPa, such as ≤250 kPa, preferable 50-300 kPa. The pressure drop is the difference between the pressure of the product mixture that is introduced into the flash vessel, and the pressure in the flash vessel. For example, the pressure of the product mixture that is introduced into the flash vessel may be ≥200 kPa, such as 200-400 kPa.

Such flash separation results in a vapor phase comprising a quantity of the raw materials that were not consumed during the polymerization reaction. It is desirable to strive for recycling of the raw materials in the vapor phase obtained from the flash separation. Such raw materials may include unreacted compounds comprising at least 2 unsaturated carbon-carbon bonds, such as unreacted butadiene.

This has now been achieved according to the invention by a process for the production of a polymer using a compound comprising at least 2 unsaturated carbon-carbon bonds, wherein the process comprises a polymerization section and a purification section, wherein the product from the polymerization section is subjected in the purification section to a sequence of purification steps comprising:

removal of the vapor phase from the product from the polymerization section by means of flash separation to obtain a first vapor phase and a polymerization product;

subjecting the first vapor phase to a compression and condensation treatment to obtain a second vapor phase and a condensed monomer phase;

wherein the purification steps are conducted in this order.

It is particularly preferred that the compound comprising at least 2 unsaturated carbon-carbon bonds is selected from a butadiene, a pentadiene, a hexadiene, a heptadiene, an octadiene, or combinations thereof. Most preferably, the compound comprising at least 2 unsaturated carbon-carbon bonds is 1,3-butadiene.

In order to convert the raw materials in the vapor phase from the flash separation into a stream of raw materials that may be supplied to the polymerization section, it is required that the raw materials are extracted from the vapor phase and converted into a liquid form. Such extraction and conversion may be performed by subjecting the first vapor phase to a compression and condensation treatment. Such compression and condensation treatment may result in a condensed monomer phase and a second vapor phase. The condensed monomer phase may comprise the unreacted raw materials such as butadiene. The condensed monomer phase obtained from the compression and condensation treatment may be recycled and fed to the polymerization section.

The compression may for example be conducted in a compressor such as a liquid ring compressor. Alternatively, more than one compressor may be used. In particular, such compressor may be a gas compressor. Typical gas compressors that may be suitable are positive displacement compressors including rotary screw compressors, rotary vane compressors, and liquid-ring compressors. In particular, liquid-ring compressors are suitable for the compression of the first vapor phase obtained in the process according to the present invention.

Such liquid-ring compressors typically comprise a cylindrical compression chamber in which a rotor is positioned in an offset position. A liquid is present which during the movement of the rotor forms a layer along the inner wall of the cylinder. It is particularly preferred that the liquid-ring compressor are operated using water as liquid for forming the liquid layer. The rotor typically comprises an axis and vanes that are connected to the rotor lengthwise to the axis, comprising open spaces between the vanes. These open spaces typically are sealed by the liquid layer during rotary operation. Due to the offset position of the rotor, the volume of the open spaces gradually decreases and again increases. One or more gas inlet(s) may be positioned such that the gas enters the compression chambers in such way that it fills the open space(s) having the largest volume. The gas that is fed into the compression chamber is preferably the first vapor phase. By rotation, the volume of the open space in which the gas in entered is reduced, and accordingly, the gas is compressed. One or more gas outlet(s) are preferably positioned such that it allows for the gas the leave the compression chamber in such position of the rotor where the volume of the open space between the vanes and the liquid layer is the smallest. Liquid-ring compressors can be single- or multistage. A multistage compressor may have for example two compression stages on a common shaft.

Typical liquid-ring compressors are for example described in 'Liquid Ring Vacuum Pumps, Compressors and Systems', H. Bannwarth, ISBN: 978-3-527-31249-8.

In operation of such liquid-ring compressor, conditions preferably are such that the quantity of the liquid used to form the liquid layer in the compression chamber is sufficiently high to ensure the desired compression, but not too high to avoid reduction in the efficiency of the compressor.

Preferably, the compression step comprises compression of the first vapor phase to a pressure of ≥400 kPa. The compressed vapor phase exiting the compressor may for example have a pressure of ≥400 kPa, more preferably ≥500 kPa, more preferably ≥500 kPa and ≤1.0 MPa.

The compressed vapor phase exiting the compressor may be subjected to a condensation treatment by feeding to a condenser. Such condenser may for example for example be a shell and tube heat exchanger with a cooling water feed. From the condenser, a condensed monomer phase and a non-condensable phase may be obtained.

The condensed monomer phase may be subjected to separation in a decanter. Such decanter may for example be a tank. In the case where a liquid-ring compressor is used to compress the first vapor phase, the liquid from the liquid-ring reactor, for example water, may settle on the bottom of the decanter, where it may be removed and fed back to the liquid-ring compressor. The condensed monomer phase may be separated from the decanter. The condensed monomer phase may be optionally subjected to a purification treatment. The condensed monomer phase may be recycled back to the polymerization section.

The non-condensable phase, also referred to as the second vapor phase, may in a further embodiment of the process of the present invention be subjected to a further purification treatment where the second vapor phase subjected to an absorption step and a stripping step to obtain a second monomer phase. The absorption step preferably is conducted at a pressure of ≥300 kPa, such as ≥300 kPa and ≤550 kPa.

The absorption step may be performed in a packed column separator. Preferably, the packed column separator is positioned vertically and has an inlet positioned above the packed section of the column where a mineral oil is fed to the column, an inlet where the second vapor phase is entered into the column, and an outlet at the bottom where the mineral oil comprising the absorbed compound comprising at least 2 unsaturated carbon-carbon bonds is removed from the column. The mineral oil may for example be fed to the column at a temperature of 40-60° C., preferably 45-55° C.

In a preferred embodiment, the absorption step is performed in a vertically positioned packed column separator having an inlet positioned above the packed section of the column where a mineral oil having a temperature of 45-55° C. is fed to the column, and an outlet at the bottom where the mineral oil comprising the absorbed compound comprising at least 2 unsaturated carbon-carbon bonds is removed from the column. Preferably, the second vapor phase is entered into the column via an inlet positioned below the packed section of the column.

The mineral oil preferably is a synthetic isoparaffinic hydrocarbon. Preferably, the mineral oil has an aromatic content of ≤30 wt %, more preferably ≤20 wt %. Also preferably, the mineral oil has a flash point of ≥40° C. as determined in accordance with ISO 1523 (2002). It is particularly preferred that the mineral oil is a synthetic isoparaffinic hydrocarbon having an aromatic content of ≤20 wt % and a flash point of ≥40° C. as determined in accordance with ISO 1523 (2002). It is further preferred that the mineral oil is a C10-C12 mineral oil, such as a mineral oil comprising at least 98 wt % of molecules comprising 10-12 carbon atoms. The use of such oil may contribute to the prevention of carryover of the mineral oil with the compound comprising at least 2 unsaturated carbon-carbon bonds.

In a preferred modus of operation of the absorption step, the mineral oil is transported along the packed section of the packed column separator in a downward flow, and the second vapor phase is transported along the packed section of the packed column separator in an upward flow, so that the mineral oil and the second vapor phase flow counter-currently along the packed section. Operating the absorption step in such way contributes to the absorption efficiency.

In an embodiment of the invention, the absorption step involves absorption of the compound comprising at least 2 unsaturated carbon-carbon bonds in a mineral oil, and the stripping step involves separation of the compound comprising at least 2 unsaturated carbon-carbon bonds from the mineral oil. Preferably, the stripping step is conducted at a pressure of ≤600 kPa. It is also preferable that the stripping step is conducted at a temperature of ≤70° C. It is particularly preferred that the stripping step is conducted at a pressure of ≤600 kPa and at a temperature of ≤70° C.

The stripping step may for example be performed in a vertically positioned packed column separator equipped with a reboiler at the bottom of the column.

From the stripping step, a second monomer phase may be obtained. This second monomer phase may be recycled back to the polymerization section.

In certain embodiments, the process according to the present invention may be a continuous process, in which the polymerization section operates in a continuous way and the purification section operates in a continuous way. In such embodiment, the recycling of the condensed monomer phase may be done directly; alternatively, the condensed monomer phase obtained from the compression and condensation treatment may be fully or partially stored before further utilisation in the polymerization section.

It is particularly preferred that the process according to the present invention comprises the conversion of at least 95 wt % of the monomer comprising at least 2 unsaturated carbon-carbon bonds that is introduced to the polymerization section, more preferable at least 98 wt %, even more preferable at least 99 wt %.

Alternatively, the invention also comprises embodiments where the polymerization process comprises the production of polymers by polymerization of a compound comprising at least 2 unsaturated carbon-carbon bonds, where the compound comprising at least 2 unsaturated carbon-carbon bonds is 1,3-butadiene. Preferably, the process according to the present invention comprises the conversion of at least 95 wt % of the 1,3-butadiene that is introduced to the polymerization section, more preferable at least 98 wt %, even more preferable at least 99 wt %.

The polymerization section may comprise one single reactor, or alternatively multiple reactors.

The separation section may receive a product mixture for separation from one single reactor of from multiple reactors.

The present invention also involves certain embodiments in which the polymerization section comprises multiple reactors operating in batch operation, in which the product mixture from these batch reactors is fed to the separation section, wherein the separation section operates in a continuous operation.

In a particularly preferred embodiment, the present invention relates to a process for the production of a polymer using a compound comprising at least 2 unsaturated carbon-carbon bonds being 1,3-butadiene, wherein the process comprises a polymerization section and a purification section, wherein the product from the polymerization section is subjected in the purification section to a sequence of purification steps comprising:
  removal of the vapor phase from the product from the polymerization section by means of flash separation to obtain a first vapor phase and a polymerization product wherein the pressure drop in the flash separation is 50-300 kPa; and
  subjecting the first vapor phase to a compression in a liquid-ring compressor to a pressure of ≥400 kPa and condensation treatment in a shell and tube heat exchanger with a cooling water feed as condenser to obtain a second vapor phase and a condensed monomer phase;
  wherein the purification steps are conducted in this order, and wherein the condensed monomer phase is recycled back to the polymerization section.

Further particularly preferred is an embodiment of the present invention relating to a process for the production of a polymer using a compound comprising at least 2 unsaturated carbon-carbon bonds being 1,3-butadiene, wherein the process comprises a polymerization section and a purification section, wherein the product from the polymerization section is subjected in the purification section to a sequence of purification steps comprising:
  removal of the vapor phase from the product from the polymerization section by means of flash separation to obtain a first vapor phase and a polymerization product wherein the pressure drop in the flash separation is 50-300 kPa; and
  subjecting the first vapor phase to a compression in a liquid-ring compressor to a pressure of ≥400 kPa and condensation treatment in a shell and tube heat exchanger with a cooling water feed as condenser to obtain a second vapor phase and a condensed monomer phase;
  wherein the purification steps are conducted in this order and wherein the condensed monomer phase is recycled back to the polymerization section;
  wherein the process further comprises subjecting the second vapor phase to an absorption step and a stripping step to obtain a second monomer phase;
  wherein the absorption step is conducted at a pressure of ≥300 kPa and ≤550 kPa;
  wherein the absorption step is performed in a vertically positioned packed column separator having an inlet positioned above the packed section of the column where a mineral oil being a synthetic isoparaffinic hydrocarbon having an aromatic content of ≤20 wt % and a flash point of ≥40° C. as determined in accordance with ISO 1523 (2002) and having a temperature of 45-55° C. is fed to the column, an inlet where the second vapor phase is entered into the column, and an outlet at the bottom where the mineral oil comprising the absorbed compound comprising at least 2 unsaturated carbon-carbon bonds is removed from the column;
  wherein the stripping step involves separation of the compound comprising at least 2 unsaturated carbon-carbon bonds from the mineral oil at a pressure of ≤600 kPa and at a temperature of ≤70° C. in a vertically positioned packed column separator equipped with a reboiler at the bottom of the column;
  wherein the second monomer phase is recycled back to the polymerization section.

DESCRIPTION OF THE FIGURES

Particular embodiments of the invention are exemplified in FIGS. 1 and 2.

In FIG. 1:
  material stream A represents the reaction mixture comprising a compound comprising at least 2 unsaturated carbon-carbon bonds;
  unit I represents the polymerization section;
  material stream B represents the product from the polymerization section;
  units II, III and IV represent the purification section, in which unit II represents the flash separation vessel;
  material stream C represents the polymerization product separated by the flash separation;
  material stream D represents the first vapor phase obtained from the flash separation vessel;
  unit III represents the compressor;
  material stream E represents the compressed first vapor phase;
  unit IV represents the condenser;
  material stream F represents the condensed monomer phase which is fed back to the polymerization section; and
  material stream G represents the second vapor phase.

In a more particular embodiment, the process according to the present invention further comprises an absorption step and a stripping step. FIG. 2 presents a disclosure of an embodiment of the invention comprising such absorption step and stripping step, wherein:
  unit V represents the absorption unit;
  material stream H represents the absorbing medium;
  material stream J represents the absorbing medium comprising the absorbed compounds;
  unit VI represents the stripping unit;
  material stream K represents a waste material stream; and
  material stream L represents the second monomer phase which is fed back to the polymerization section.

Figure 1:
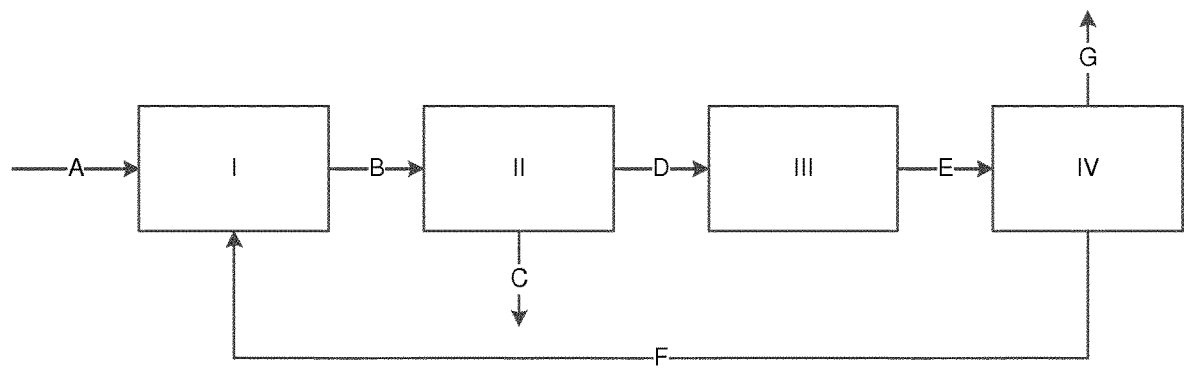
FIG. 1 presents the process according to the invention comprising a polymerization section represented by unit I and a purification section represented by units II, III and IV, wherein unit II is a flash separation vessel, unit III is a compressor and unit IV is a condenser, from which a condensed monomer phase F is obtained that is fed back to the polymerization section.
Figure 2:
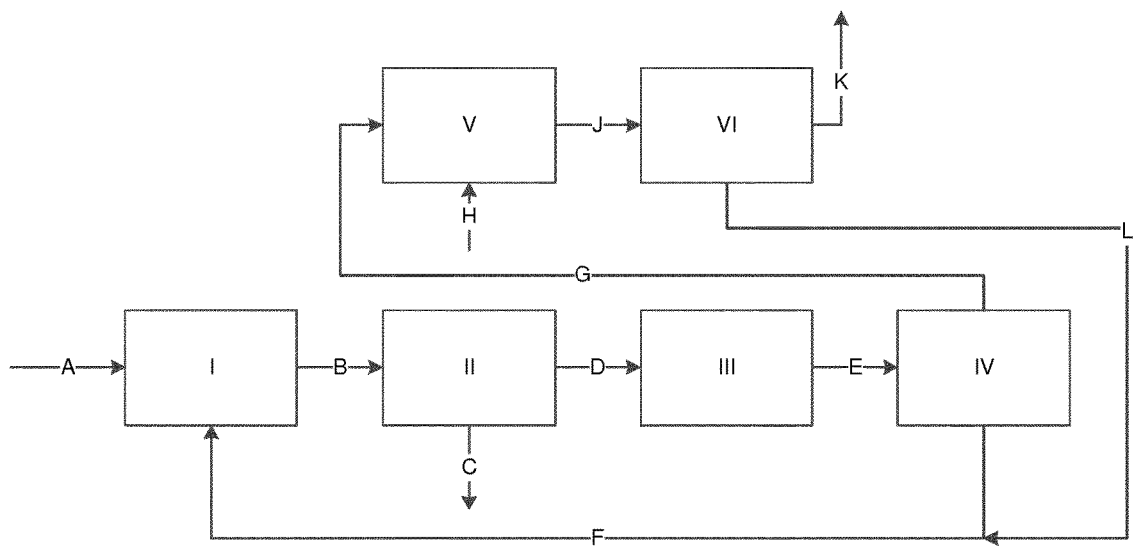
FIG. 2 presents the process according the invention of the embodiment of FIG. 1 further comprising subjecting the second vapor phase G to an absorption step represented by unit V and a stripping step represented by unit VI to obtain a second monomer phase that is fed back to the polymerization section.

The present invention will now be illustrated by the following non-limiting example.

In a polymerization section I comprising polymerization reactor, a reaction mixture A comprising 16913 kg 1,3-butadiene and 24000 kg water were reacted in a batch operation to obtain a material stream B comprising 16045 kg polybutadiene as polymerization product and 868 kg 1,3-butadiene. The material stream B was fed to a flash separation vessel II at a temperature of 63° C. and a pressure of 348 kPa. From the flash separation vessel, a material stream C comprising 16045 kg of the polymerization product and 43 kg 1,3-butadiene at a temperature of 61° C. and a pressure of 376 kPa was obtained, and a material stream D representing the first vapor phase, comprising 825 kg 1,3-butadiene and 16 kg water, at a temperature of 53° C. and a pressure of 121 kPa was obtained.

The material stream D was fed to a compressor III at a pressure of 121 kPa and a temperature of 53° C. at a rate of 2162 kg 1,3-butadiene and 43 kg water. The material stream E exited the compressor at a pressure of 445 kPa and a temperature of 20° C., and entered a condenser IV at these pressure and temperature conditions, at a rate of 2162 kg 1,3-butadiene and 43 kg water. A material stream F was obtained from the condenser at a pressure of 575 kPa and a temperature of 20° C. comprising 1788 kg/h of recovered 1,3-butadiene which may be recycled to be used in polymerization section I, and a material stream G representing a second vapor phase, at a temperature of 20° C. and a pressure of 445 kPa, comprising 374 kg/h of 1,3-butadiene and 43 kg/h of water.

The use of the process according to this example resulted in a reduction of the 1,3-butadiene loss in waste streams to 0.9 wt % of the quantity of 1,3-butadiene that was fed to the polymerization section, compared to 5.1 wt % without the use of a condenser.

In a further example, the material stream G was further subjected to an absorbing and stripping step. To an absorber unit V, the second vapor phase G was supplied at a temperature of 20° C. and a pressure of 445 kPa at a rate of 374 kg/h of 1,3-butadiene and 43 kg/h of water, and was brought into contact with a quantity of a mineral oil H. The stream J exiting the absorber unit was supplied to a stripper unit VI resulting in a waste stream K comprising 8 kg/h of 1,3-butadiene and 43 kg/h of water, and a material stream L comprising 366 kg/h 1,3-butadiene, which may be recycled to be used in polymerization section I.

The use of the process according to this example resulted in a reduction of the 1,3-butadiene loss in waste streams to 0.02 wt % of the quantity of 1,3-butadiene that was fed to the polymerization section.

The invention claimed is:

1. A process for the production of a polymer using a compound comprising at least 2 unsaturated carbon-carbon bonds, wherein the process comprises a polymerization section and a purification section, wherein the product from the polymerization section is subjected in the purification section to a sequence of purification steps comprising:
    removing the vapor phase from the product from the polymerization section by means of flash separation to obtain a first vapor phase and a polymerization product; and
    subjecting the first vapor phase to a compression and condensation treatment to obtain a second vapor a phase and a condensed monomer phase;
    wherein the purification steps are conducted in this order.

2. The process according to claim 1, wherein the compound comprising at least 2 unsaturated carbon-carbon bonds is selected from a butadiene, a pentadiene, a hexadiene, a heptadiene, an octadiene, or combinations thereof.

3. The process according to claim 1, wherein the compound comprising at least 2 unsaturated carbon-carbon bonds is 1,3-butadiene.

4. The process according to claim 1, wherein the compression step comprises compression of the first vapor phase to a pressure of ≥400 kPa.

5. The process according to claim 1, wherein the compression and condensation treatment is performed using a positive displacement compressor.

6. The process according to claim 1, wherein the condensed monomer phase is recycled back to the polymerization section.

7. The process according to claim 1 wherein the second vapor phase is further subjected to an absorption step and a stripping step to obtain a second monomer phase.

8. The process according to claim 7, wherein the absorption step is conducted at a pressure of ≥300 kPa and ≤550 kPa.

9. The process according to claim 7, wherein the absorption step is performed in a vertically positioned packed column separator having an inlet positioned above the packed section of the column where a mineral oil having a temperature of 45-55° C. is fed to the column, an inlet where the second vapor phase is entered into the column, and an outlet at the bottom where the mineral oil comprising the absorbed compound comprising at least 2 unsaturated carbon-carbon bonds is removed from the column.

10. The process according to claim 7, wherein the absorption step comprises absorption of the compound comprising at least 2 unsaturated carbon-carbon bonds in a mineral oil, and wherein the stripping step comprises separation of the compound comprising at least 2 unsaturated carbon-carbon bonds from the mineral oil.

11. The process according to claim 9, wherein the mineral oil is a synthetic isoparaffinic hydrocarbon having an aromatic content of ≤20 wt % and a flash point of ≥40° C. as determined in accordance with ISO 1523 (2002).

12. The process according to claim 7, wherein the stripping step is conducted at a pressure of ≤600 kPa and at a temperature of ≥45° and ≤70° C.

13. The process according to claim 7, wherein the stripping step is performed in a vertically positioned packed column separator equipped with a reboiler at the bottom of the column.

14. The process according to claim 7, wherein the second monomer phase is recycled back to the polymerization section.

15. The process according to claim 1, wherein ≥95 wt % of the monomer comprising at least 2 unsaturated carbon-carbon bonds that is introduced to the polymerization section is converted into the polymerization product.

* * * * *